(12) United States Patent
Kallabis

(10) Patent No.: US 6,577,388 B2
(45) Date of Patent: Jun. 10, 2003

(54) LASER LEVEL WITH PROTECTIVE HOUSING

(75) Inventor: Gabriel Kallabis, Spirkelbach (DE)

(73) Assignee: Stabila-Messgeräte Gustav Ullrich GmbH, Annweiler am Trifels (DE)

( * ) Notice: Subject to any disclaimer, the term of this patent is extended or adjusted under 35 U.S.C. 154(b) by 0 days.

(21) Appl. No.: 10/026,424

(22) Filed: Dec. 19, 2001

(65) Prior Publication Data

US 2002/0080342 A1 Jun. 27, 2002

(30) Foreign Application Priority Data

Dec. 22, 2000 (DE) .......................................... 200 21 784

(51) Int. Cl.[7] .......................... G01B 11/26; G01B 11/00; G01C 1/00; G01C 15/00; G01C 5/00; G01C 9/00; B43L 9/00
(52) U.S. Cl. ...................... 356/139.1; 356/400; 33/286; 33/451; 33/290; 33/299
(58) Field of Search ............................... 356/139.1, 400; 33/286, 290, 291, 299, 451; 206/305, 316.1, 349–383

(56) References Cited

U.S. PATENT DOCUMENTS

| | | | | |
|---|---|---|---|---|
| 3,897,637 A | * | 8/1975 | Genho | 33/227 |
| D396,817 S | * | 8/1998 | Webb | D10/74 |
| 5,864,956 A | * | 2/1999 | Dong | 33/227 |
| 5,999,346 A | * | 12/1999 | Grundstrom et al. | 359/822 |
| 6,065,217 A | * | 5/2000 | Dong | 33/290 |
| 6,249,983 B1 | * | 6/2001 | Wright et al. | 33/286 |
| D457,446 S | * | 5/2002 | Kallabis | D10/69 |
| D461,135 S | * | 8/2002 | Watson et al. | D10/69 |

* cited by examiner

Primary Examiner—Thomas H. Tarcza
Assistant Examiner—Brian K Andrea
(74) Attorney, Agent, or Firm—Friedrich Kueffner

(57) ABSTRACT

A laser level with a housing composed of two parts for storing the laser level in a protected manner, wherein the laser level is composed of an instrument body, bubble levels in the instrument body, a laser beam generator with lens system and a fixed leg and two vertically adjustable legs. One of the housing parts is provided with receptacles for the legs, wherein the receptacles are integrally formed at an inner side of the bottom of the housing part. The other housing part has receptacles for the legs, wherein the receptacles are integrally formed in an outer side of a cover of the housing part. At least one stand thread is provided at an inner side of the outer housing part.

11 Claims, 2 Drawing Sheets

LASER LEVEL WITH PROTECTIVE HOUSING

BACKGROUND OF THE INVENTION

1. Field of the Invention

The present invention relates to a laser level with a housing composed of two parts for storing the level in a protected manner. The laser level includes an instrument body and bubble levels provided in the instrument body for adjusting the instrument body. The level further includes a laser beam generator with a lens system, a fixed leg and two vertically adjustable legs.

2. Description of the Related Art

Small, easily manipulated laser levels have been commercially available for many years. They include essentially an instrument body, a laser beam generator with lens system, bubble levels for levelling the laser beam, a fixed leg which usually is in alignment with the laser beam, and at least two vertically adjustable legs by means of which the instrument body and, thus, the laser beam can be levelled.

These laser level instruments are usually sold in cases in which they are stored so as to be protected against damage and contamination and in which they can be transported.

Since the laser levels are frequently mounted on measuring stands, at least one stand thread is provided on the instrument body. Other types of instruments have two or three stand threads which are offset relative to each other by 90°. These stand threads not only increase the size of the instruments bodies, but they also apply a mechanical load which means that the instrument body must be of very sturdy construction. As a result, the laser level instrument becomes unnecessarily heavy and expensive. This is an unsatisfactory situation.

SUMMARY OF THE INVENTION

Therefore, it is the primary object of the present invention to provide a laser level and a housing suitable for storing the laser level in a protected manner which are of such a construction that the laser level can be of very small size without impairing its usefulness and functionality.

In accordance with the present invention, one of the two housing parts has receptacles for the legs, wherein the receptacles are integrally formed on the inner side of the bottom of the housing part. The other housing part has receptacles for the legs integrally formed in the outer side of the cover of the housing part. The other housing part also has at the inner side thereof at least one stand thread.

Because of the receptacles for the legs of the laser instrument integrally formed on the inner side of one housing part, the laser instrument is secured against displacement and damage during the transport thereof. However, the significant advantage of the present invention resides in the configuration of the other housing part. This other housing part has on its inner side a stand thread, so that the laser instrument itself no longer requires a stand thread. After the housing part has been screwed onto the stand, the laser instrument is placed with its legs into the appropriate receptacles in the form of recesses, so that the laser instrument is placed in a secure and stable manner and can be easily operated.

Consequently, the housing not only meets the conventional protective function, but the housing also partially carries out functions of the laser level itself. The legs and the receptacles are preferably constructed in such a way that a locked connection is produced. This means that the laser instrument is placed in an optimum secure manner on the housing part.

In accordance with an advantageous further development of the invention, the stand thread is in alignment with the receptacle for the fixed leg. This ensures that no harmful axial offset is produced during rotation of the housing part and the laser instrument.

In accordance with another further development of the invention, at least one of the housing parts has means, particularly in the form of eyes or slots, for attaching the housing part to a wall. It does not constitute a problem if the attachment to the wall is not exactly horizontal because the laser instrument placed on the housing part can be adjusted or levelled by means of its vertically adjustable legs and its bubble levels.

In accordance with an advantageous feature, one of the housing parts has receptacles, for example, for a prism, for replacement batteries and the like, integrally formed to the inner side of the housing part.

In accordance with a further development of the invention, the other housing part has supports, for example, for the prism, the replacement batteries, and the like, integrally formed to the inner side thereof.

It is understood that the two housing parts must be securely connected to each other during the transport thereof. Simultaneously, it must be possible to quickly separate the two parts. These two requirements are met in an optimum manner by providing resilient locking projections and corresponding locking grooves at the housing parts.

If a housing type is desired which is composed of a single piece, the two housing parts can be connected to each other in an articulated manner by means of hinges, particularly film-type hinges. Alternatively, it is also possible to provide an embodiment in which the two housing parts can be closed in the manner of drawers.

The two housing parts are preferably manufactured of plastics material. Of course, the material used must be as impact resistant as possible. This makes it possible to shape the housing in such a way that it provides an optimum protective function while requiring as little material as possible.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
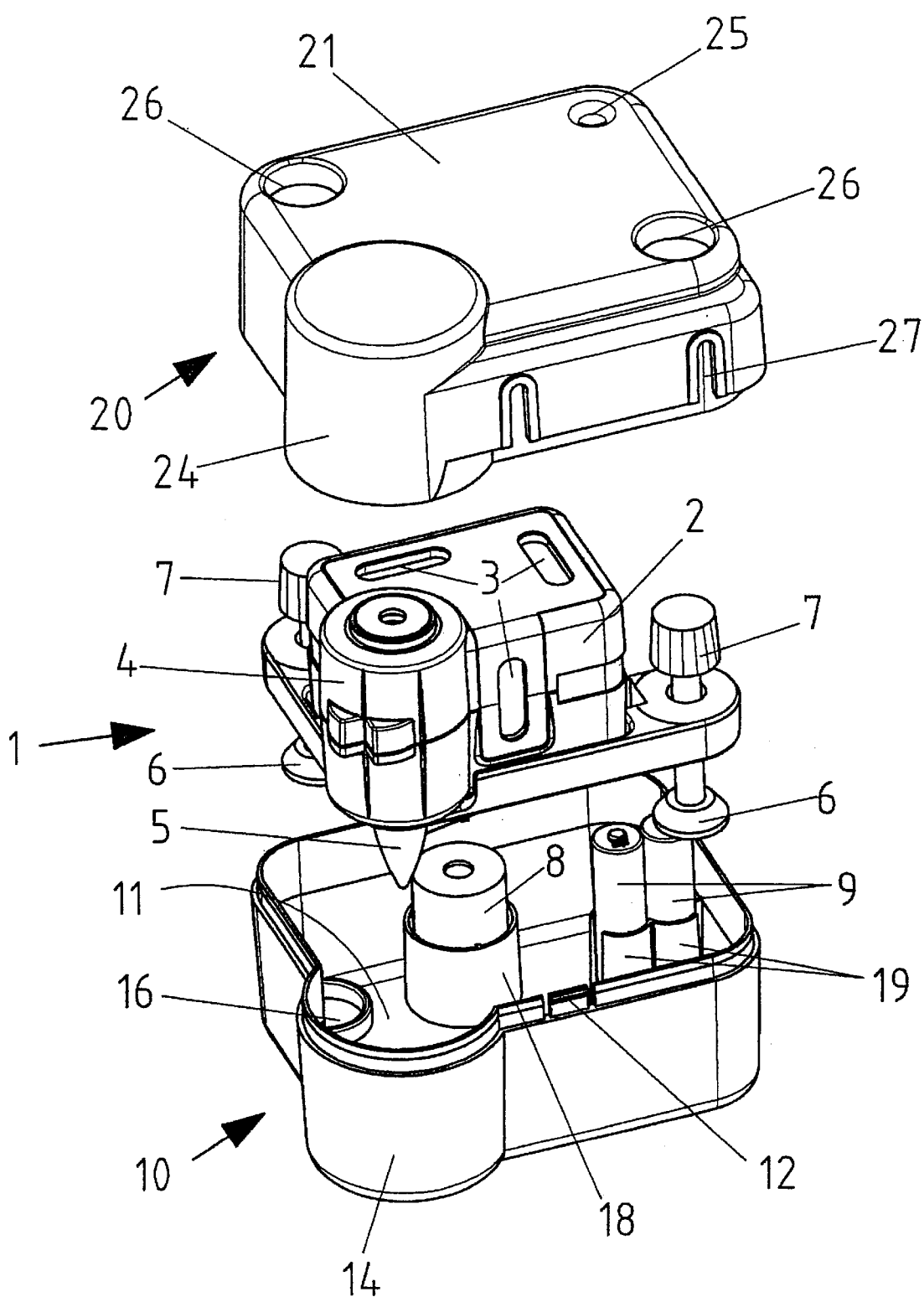
FIG. 1 is an exploded perspective view of a laser level instrument with its two-part protective and transport housing according to the present invention.

FIG. 1 shows in an exploded perspective view a laser level instrument 1 and a housing composed of lower housing part 10 and upper housing part 20 for storing the laser instrument 1 in a protected manner.

The laser level instrument 1 has a housing body 2 in which bubble levels three are provided for levelling the laser level instrument 1. Also provided is a laser beam generator 4 with a lens system. Levelling of the instrument 2 is effected by means of 3 legs 5, 6, wherein the leg 5 in alignment with the laser beam generator 4 is stationary, while the other two legs 6 are vertically adjustable by means of threaded spindles 7.

The lower housing part 10 has a bottom 11, wherein receptacles for the legs 5, 6 of the laser instrument 1 are integrally formed on the inner side of the bottom 11. Visible in the drawing is only a portion of a receptacle 16.

Also visible at the inner side of the lower housing part 10 are a receptacle 18 for a prism 8 and receptacles 19 for replacement batteries 9, wherein the receptacles 18 and 19 are integrally formed on the inner side of the lower housing part 10.

The lower housing part 10 has an outwardly curved portion 14 whose shape is adapted to that of the laser beam generator 4 of the laser level instrument 1. Consequently, the housing 10, 20 surrounds the laser instrument 1 at all sides at a distance which is as small as possible while still being sufficient. Consequently, the complete device requires very little space.

The upper housing part 20 has a cover 21, wherein recesses 25, 26 are integrally formed in the outer side of the cover 21. These recesses 25, 26 correspond in their shape to that of the legs 5, 6 of the laser level instrument 1.

Finally, eyes or slots 27 can be seen at the rear side of the upper housing part 20. These eyes or slots 27 are provided for securing the upper housing part 20 to a wall or the like.

Figure 2:
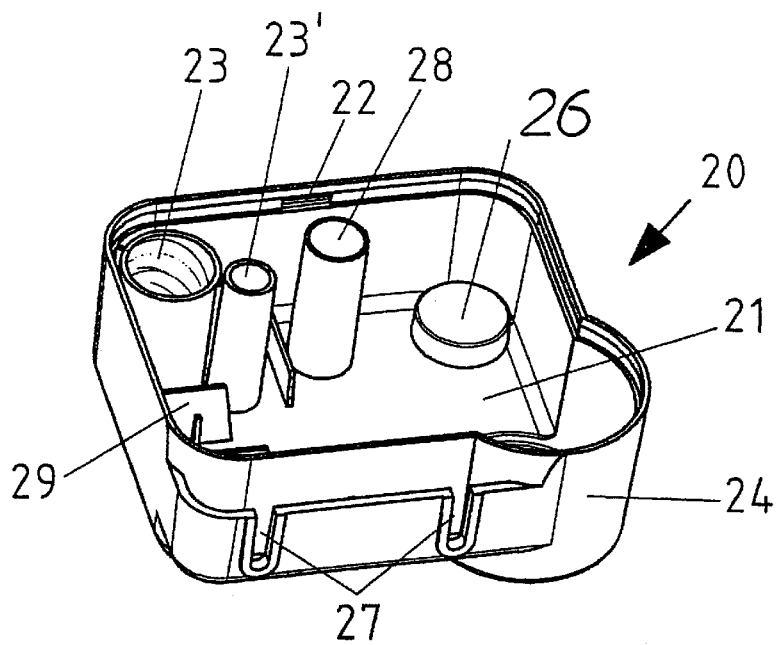
FIG. 2 is a perspective view showing the inner side of the upper housing part of FIG. 1.

FIG. 2 of the drawing shows the interior of the upper housing part 20. Integrally formed with the cover 21 is a stand thread 23, wherein the axis of the stand thread is in alignment with the axis of the fixed leg 5 and, thus, with the axis of the laser beam, and wherein, on the other hand, the axis of the stand thread 23 is in alignment with the axis of the recess 25 integrally formed in the outer side. Of course, these features could also be provided in the same manner on the lower housing part 10.

Also integrally formed to the upper housing part 20 may be a second stand thread 23', a support for the prism 8 placed in the lower housing part 10, as well as a support 29 for the replacement batteries 9 placed in the lower housing part 10.

Resilient locking projections 12 at the lower housing part 10 and corresponding grooves 22 at the upper housing part 20 make it possible to releasably connect the two housing parts 10, 20.

Figure 3:
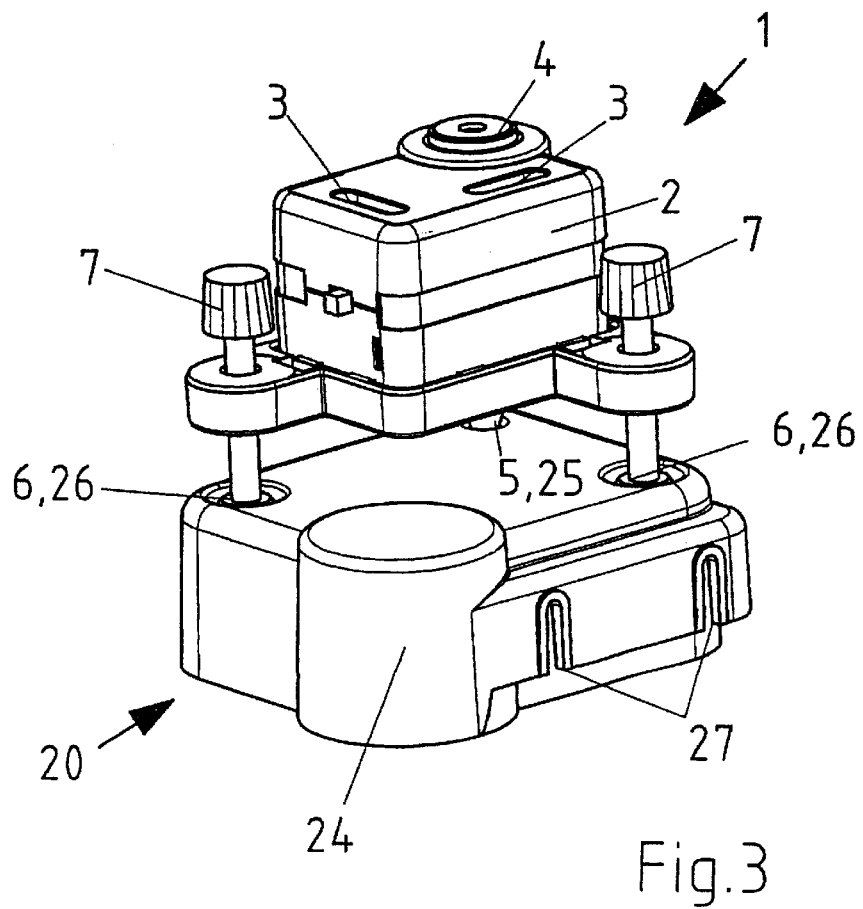
FIG. 3 is a perspective view showing the upper housing part of FIGS. 1 and 2 with the laser instrument placed thereon.

Finally, FIG. 3 shows the upper housing part 20 and the laser level instrument 1 in the position of use. The legs 5, 6 of the laser level instrument 1 are placed in the corresponding recesses 25, 26 on the outer side of the upper housing part 20. Consequently, the legs cannot slip, so that the operation of the vertically adjustable legs 6, 7 and of the level instrument 1 itself is without problems.

While specific embodiments of the invention have been shown and described in detail to illustrate the inventive principles, it will be understood that the invention may be embodied otherwise without departing from such principles.

I claim:

1. A laser level in combination with a housing composed of first and second housing parts for storing the laser level in a protective manner, the laser level comprising an instrument body and bubble levels in the instrument body, a laser beam generator with a lens system, and a fixed leg and two vertically adjustable legs, wherein the first housing part has a bottom, wherein receptacles for the legs are integrally formed on an inner side of the bottom, the second housing part has a cover, wherein receptacles for the legs are integrally formed on an outer side of the cover, and at least one stand thread mounted on an inner side of the cover.

2. The laser level with housing according to claim 1, wherein the at least one stand thread is in alignment with one of the receptacles for the fixed leg.

3. The laser level with housing according to claim 1, wherein the legs are configured to be received in the receptacles.

4. The laser level with housing according to claim 1, wherein at least one of the housing parts has means for attaching the housing part to a wall.

5. The laser level with housing according to claim 4, wherein the attachment means are eyes.

6. The laser level with housing according to claim 1, wherein at least one of the housing parts has integrally formed to an inner side thereof at least one of a receptacle and a support for a prism, replacement battery, or the like.

7. The laser level with housing according to claim 1, wherein the housing parts have resilient locking projections and corresponding locking grooves for releasably connecting the two housing parts with each other.

8. The laser level with housing according to claim 1, wherein the two housing parts are connected in an articulated manner by a hinge.

9. The laser level with housing according to claim 8, wherein the hinge is a film-type hinge.

10. The laser level with housing according to claim 1, wherein the housing parts are closable in the manner of drawers.

11. The laser level with housing according to claim 1, wherein the two housing parts are of plastics material.

* * * * *